(12) United States Patent
Zhang et al.

(10) Patent No.: US 8,457,487 B2
(45) Date of Patent: Jun. 4, 2013

(54) CAMERA ASSEMBLY AND PORTABLE ELECTRONIC DEVICE

(75) Inventors: Bo Zhang, Shenzhen (CN); Ming-Fu Luo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/327,779

(22) Filed: Dec. 16, 2011

(65) Prior Publication Data

US 2013/0045002 A1 Feb. 21, 2013

(30) Foreign Application Priority Data

Aug. 16, 2011 (CN) .......................... 2011 1 0234320

(51) Int. Cl.
*G03B 19/00* (2006.01)
*G03B 17/00* (2006.01)
*G03B 17/02* (2006.01)
*G03B 11/04* (2006.01)
*H04N 5/225* (2006.01)
*G02B 7/02* (2006.01)

(52) U.S. Cl.
USPC ........... 396/429; 396/448; 396/529; 396/535; 348/340; 348/374; 348/376; 359/511; 359/513; 359/819

(58) Field of Classification Search
USPC .......... 396/429, 133, 448, 529, 535; 348/340, 348/374, 376, 552; 359/507, 513, 819, 822, 359/823, 824, 825, 826, 511
See application file for complete search history.

(56) References Cited

U.S. PATENT DOCUMENTS

2008/0174692 A1* 7/2008 Kusaki et al. ................. 348/374
2009/0252488 A1* 10/2009 Eromaki et al. .............. 396/529

* cited by examiner

*Primary Examiner* — Rochelle-Ann J Blackman
(74) *Attorney, Agent, or Firm* — Altis Law Group, Inc.

(57) ABSTRACT

A camera assembly includes a camera module, a dustproof cover and a sealing ring. The dustproof cover is assembled in front of the camera module. The sealing ring is hermetically sandwiched between the dustproof cover and the camera module. The camera module, the sealing ring and the dustproof cover cooperatively define a closed chamber. A portable electronic device using the camera assembly is also provided.

11 Claims, 4 Drawing Sheets

CAMERA ASSEMBLY AND PORTABLE ELECTRONIC DEVICE

BACKGROUND

1. Technical Field

The present disclosure generally relates to camera assemblies, and particularly to a camera assembly and a portable electronic device using the camera assembly.

2. Description of Related Art

A commonly used electronic device, such as a panel computer, a notebook computer, or a mobile phone, is often equipped with a camera assembly. However, the existing camera assembly may have a poor sealing property, such that, dust can easily enter the camera assembly, thereby seriously affecting the image quality shot by the camera assembly. In addition, the existing camera assembly has a complicated structure and is also difficult to assemble.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
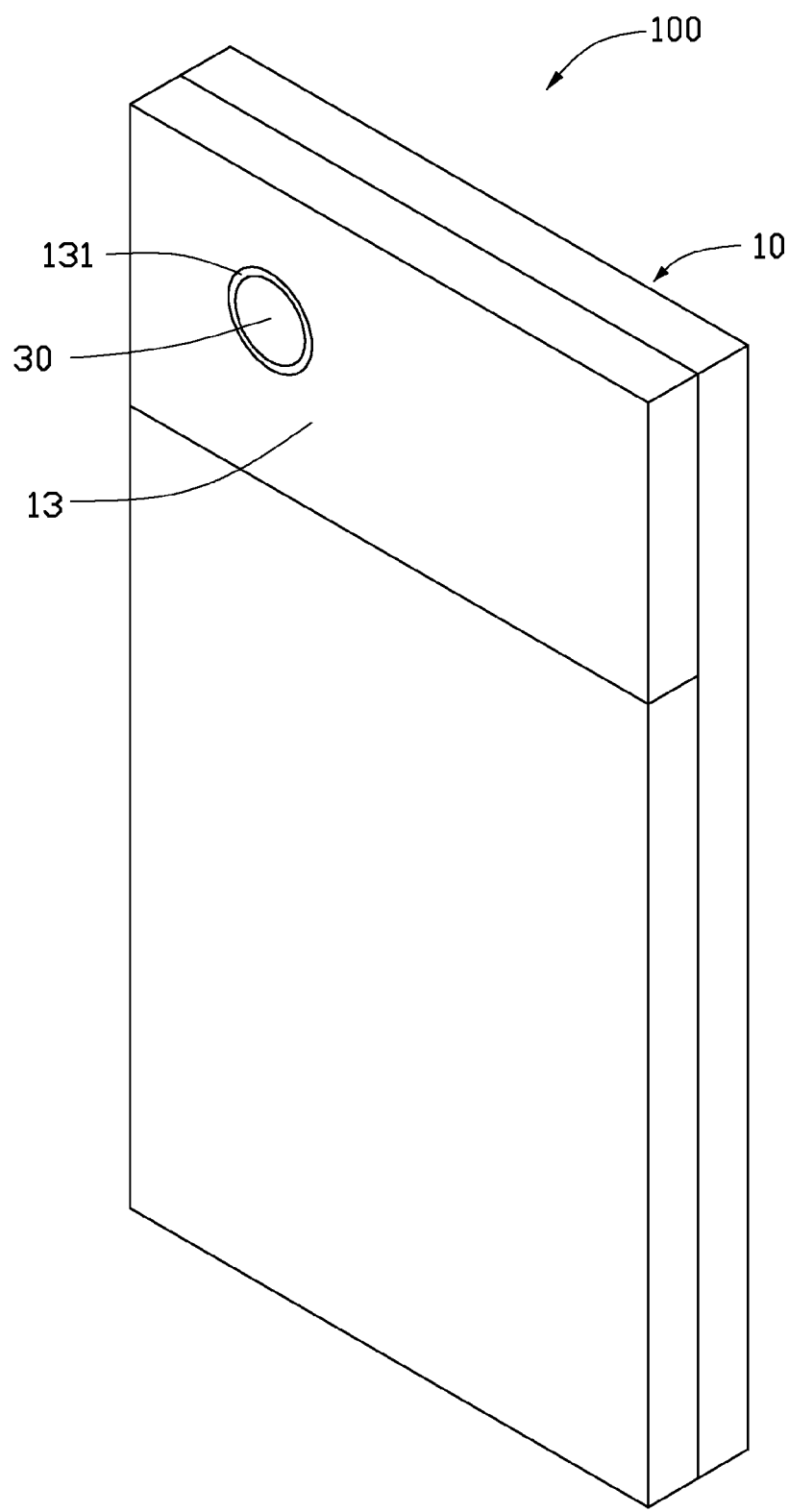
FIG. 1 shows an isometric view of an embodiment of a portable electronic device equipped with a camera assembly.

Referring to FIG. 1, an isometric view of an embodiment of a portable electronic device 100 is shown. The portable electronic device 100 can be a touch panel computer, a mobile phone, or a digital camera, for example. In the illustrated embodiment, the portable electronic device 100 is a mobile phone, and includes a main body 10 and a camera assembly 30. The main body 10 includes a back cover 13 and a camera hole 131 defined in the back cover 13. The camera assembly 30 is assembled within the main body 10 and is exposed from the camera hole 131. The portable electronic device 100 also includes other various components, such as circuit board, display screen, backlight module, for example, for performing specific functions and features. However, for simplicity, it is not described in detail here.

Figure 2:
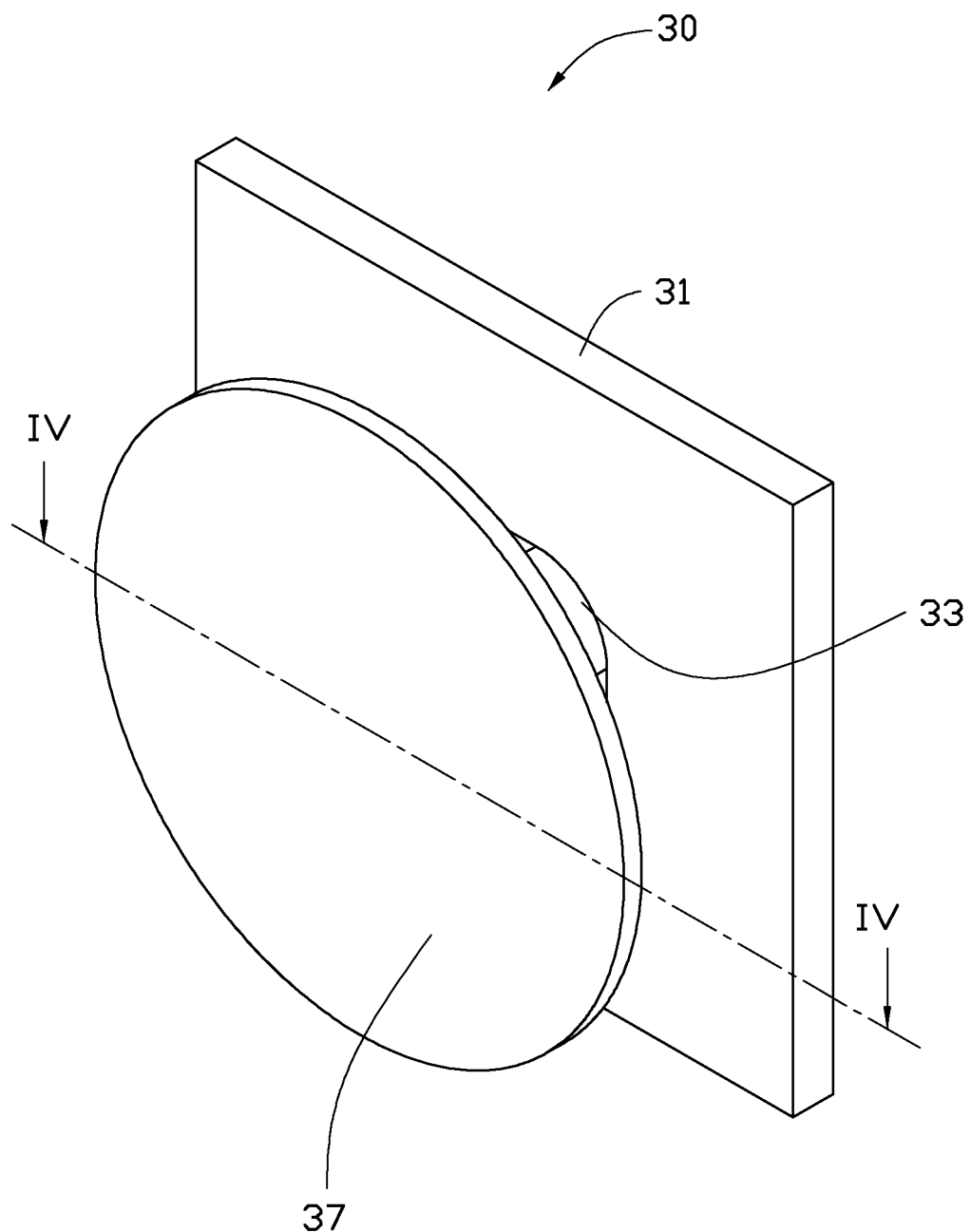
FIG. 2 shows an assembled isometric view of the camera assembly of FIG. 1.
Figure 3:
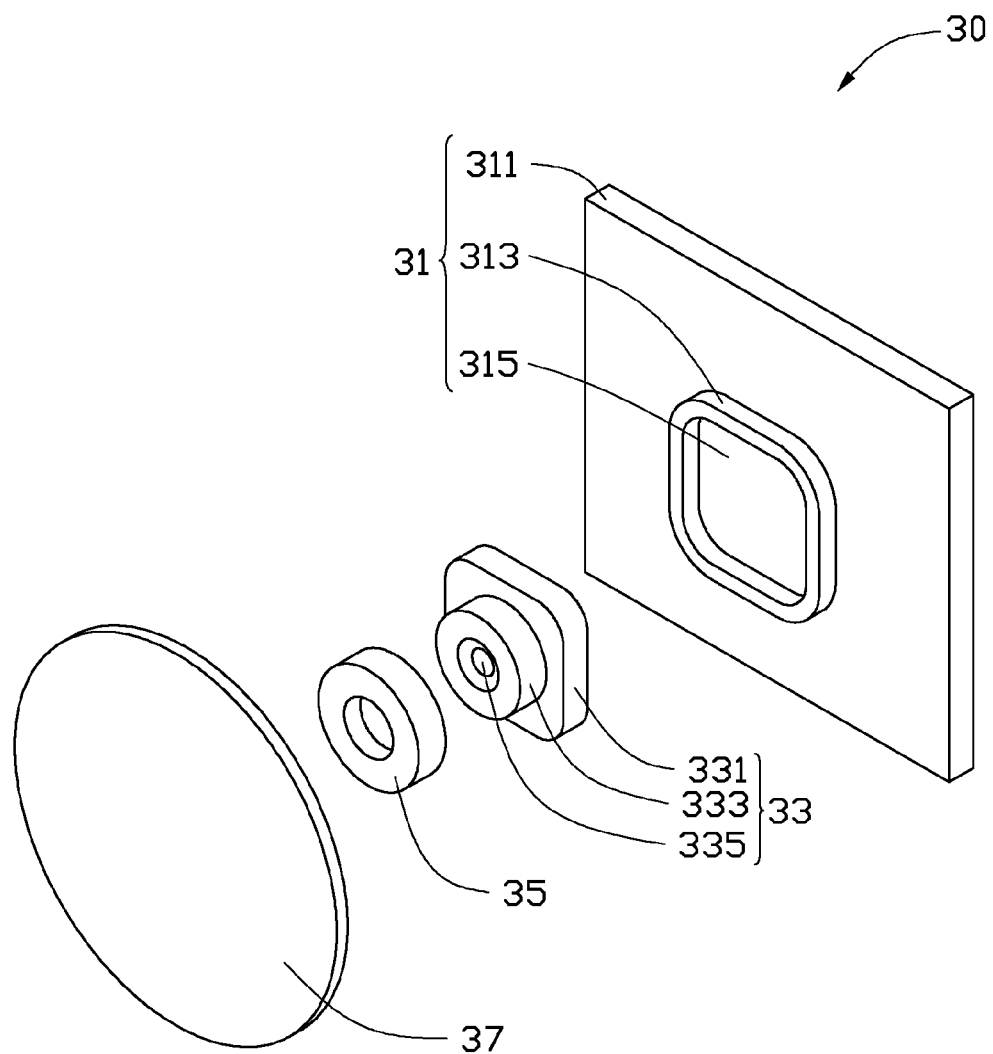
FIG. 3 shows an exploded view of the camera assembly of FIG. 2.

Also referring to FIGS. 2 and 3, the camera assembly 30 includes a support bracket 31, a camera module 33, a sealing ring 35 and a dustproof cover 37. The support bracket 31 is fixedly assembled within the main body 10. The camera module 33 is mounted on the support bracket 31 and aligns with the corresponding camera hole 131 of the back cover 13. The dustproof cover 37 is assembled within the camera hole 131 of the main body 10 and is positioned at the front of the camera module 33. The sealing ring 35 is hermetically sandwiched between the dustproof cover 37 and the camera module 33. The camera module 33, the sealing ring 35 and the dustproof cover 37 cooperatively define a closed chamber (not labeled) to prevent dust from entering the camera assembly 30.

The support bracket 31 includes a base body 311 and a receiving portion 313 formed on the base body 311. The base body 311 is a substantially rectangular board fixedly assembled within the main body 10. The receiving portion 313 is a substantially rectangular ring formed on a substantially central portion of the base body 311, and the receiving portion 313 is positioned toward the camera hole 131. The receiving portion 313 and the base body 311 cooperatively define a receiving space 315 to assembly the corresponding camera module 33.

Figure 4:
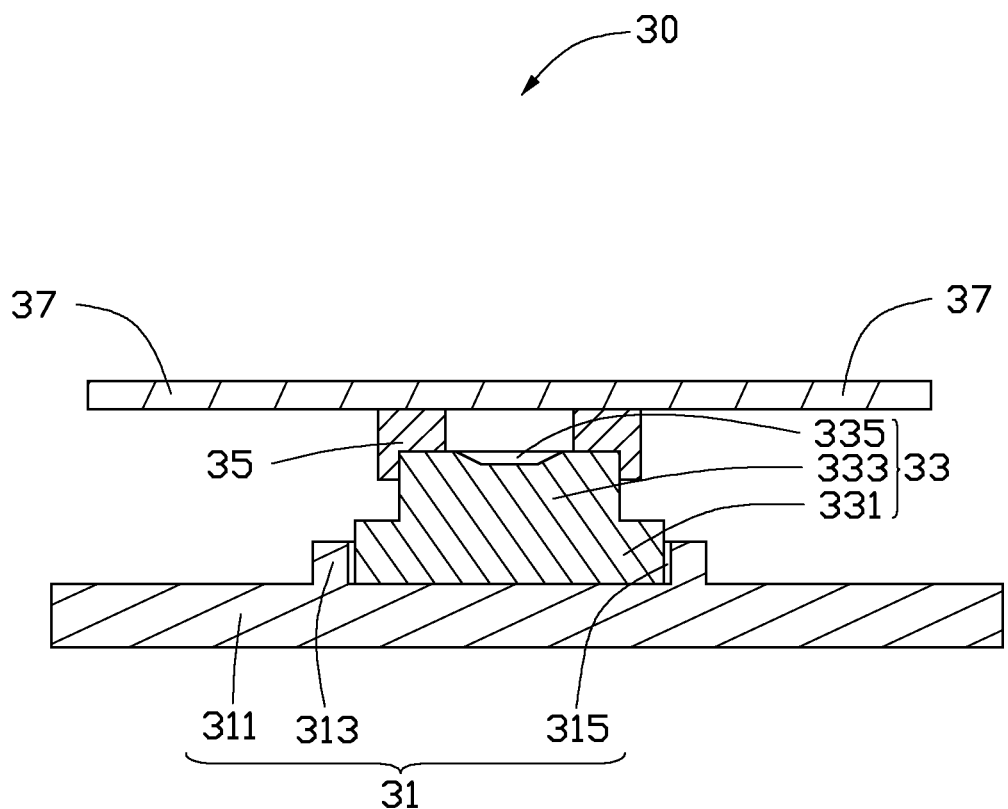
FIG. 4 shows a cross-sectional view of the assembled camera assembly of FIG. 2 taken along line IV-IV.

Also referring to FIG. 4, the shape of the camera module 33 is substantially stepped cylindrical, and includes a base portion 331, a cylindrical mounting portion 333 formed on the base portion 331 and a camera lens 335. The base portion 331 is a substantially rectangular plate having a shape substantially the same as that of the receiving space 315, such that, the base portion 331 is capable of being fixedly received within the receiving space 315 of the support bracket 31. The camera lens 335 is assembled within one end of the mounting portion 333 away from the base portion 331.

In the illustrated embodiment, the sealing ring 35 is circular shaped and is made of flexible material such as rubber, plastic, for example. The dustproof cover 37 is also circular shaped that is substantially the same as that of the camera hole 131, and the dustproof cover 37 is made of one or more transparent material.

When assembling the portable electronic device 100, the base body 311 of the support bracket 31 is first fixedly assembled within the main body 10. Then, the base portion 331 of the camera module 33 is fixedly received within the receiving space 315. The sealing ring 35 is sleeved on the mounting portion 333 of the camera module 33. The dustproof cover 37 is fixedly assembled within the camera hole 131 of the main body 10 and is covered at the front of the camera module 33 to tightly connect with the sealing ring 35, such that, the sealing ring 35 is hermetically sandwiched between the dustproof cover 37 and the camera module 33. The camera module 33, the sealing ring 35 and the dustproof cover 37 cooperatively define a closed chamber to prevent dust from entering into the camera assembly 30.

In one embodiment, the support bracket 31 can be omitted, such that, the whole camera assembly 30 can be assembled within the camera hole 131 of the back cover 13.

The camera assembly 30 has a simple structure with several components, and it is easy to assemble. Since the sealing ring 35 is hermetically sandwiched between the dustproof cover 37 and the camera module 33, the sealing ring 35, the dustproof cover 37 and the camera module 33 thus cooperatively define a closed chamber efficiently preventing dust from entering into the camera assembly 30.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A camera assembly, comprising:
   a camera module comprising a base portion, a mounting portion formed on the base portion and a camera lens, the camera lens being assembled within an end of the mounting portion away from the base portion;
   a dustproof cover positioned at the front of the camera module; and
   a sealing ring hermetically sandwiched between the dustproof cover and the camera module, wherein the sealing ring is sleeved on the mounting portion of the camera module, the dustproof cover is covered at the front of the camera module to tightly connect with the sealing ring, the camera module, the sealing ring and the dustproof cover cooperatively define a closed chamber for preventing dust from entering the camera assembly.

2. The camera assembly of claim 1, further comprising a support bracket, the support bracket comprises a base body and a receiving portion formed on the base body; the receiving portion and the base body cooperatively define a receiving space the base portion is fixedly received within the receiving space, of the support bracket.

3. The camera assembly of claim 2, wherein the sealing ring is circular shaped and is made of flexible material.

4. The camera assembly of claim 3, wherein the sealing ring is made of rubber or plastic material.

5. The camera assembly of claim 2, wherein the dustproof cover is made of one or more transparent material.

6. A portable electronic device, comprising:
a main body defining a camera hole; and
a camera assembly comprising:
 a camera module assembled within the main body and aligning with the corresponding camera hole of the back cover, the camera module comprising a base portion, a mounting portion formed on the base portion and a camera lens, the camera lens being assembled within an end of the mounting portion away from the base portion;
 a dustproof cover assembled within the camera hole and positioned at the front of the camera module; and
 a sealing ring hermetically sandwiched between the dustproof cover and the camera module, wherein the sealing ring is sleeved on the mounting portion of the camera module, the dustproof cover is covered at the front of the camera module to tightly connect with the sealing ring, the camera module, the sealing ring and the dustproof cover cooperatively define a closed chamber for preventing outer dust from entering the camera assembly.

7. The portable electronic device of claim 6, wherein the camera assembly further comprises a support bracket fixedly assembled within the main body, the camera module is mounted on the support bracket and aligns with the corresponding camera hole.

8. The portable electronic device of claim 7, wherein the support bracket comprises a base body and a receiving portion formed on the base body; the receiving portion and the base body cooperatively define a receiving space, the base portion is fixedly received within the receiving space of the support bracket.

9. The portable electronic device of claim 8, wherein the receiving portion is a substantially rectangular ring formed on a substantially central portion of the base body and positioned toward the camera hole to form the receiving space; the base portion is a substantially rectangular plate having a shape substantially the same as that of the receiving space, such that, the base portion is capable of being fixedly received within the receiving space of the support bracket.

10. The portable electronic device of claim 8, wherein the sealing ring is made of a flexible material and the dustproof cover is made of a plurality of transparent materials.

11. The portable electronic device of claim 7, wherein the main body comprises a back cover, and the camera hole is defined through the back cover.

\* \* \* \* \*